United States Patent

Hirama et al.

[11] Patent Number: 5,981,131
[45] Date of Patent: Nov. 9, 1999

[54] ELECTROSTATIC TONER COMPOSITION TO ENHANCE COPY QUALITY BY REJECTION OF GHOSTING AND METHOD OF MANUFACTURING SAME

[75] Inventors: Kazuhiro Hirama; Kenichi Nakazato; Kenzo Ogata; Kenichi Asajima, all of VA Beach; Shaw-Ping Chang, Chesapeake, all of Va.

[73] Assignee: Mitsubishi Chemical America, Inc., White Plains, N.Y.

[21] Appl. No.: 09/122,794

[22] Filed: Jul. 27, 1998

[51] Int. Cl.[6] .................................................. G03G 9/097
[52] U.S. Cl. ..................... 430/110; 430/106.6; 430/111
[58] Field of Search ............................................... 430/110

[56] References Cited

U.S. PATENT DOCUMENTS

| | | | |
|---|---|---|---|
| 5,233,008 | 8/1993 | Chen et al. | 528/33 |
| 5,447,815 | 9/1995 | Kato et al. | 430/110 |
| 5,463,453 | 10/1995 | Kurotori et al. | 430/114 |
| 5,464,722 | 11/1995 | Tomiyama et al. | 430/109 |
| 5,604,039 | 2/1997 | Chen et al. | 428/447 |
| 5,686,054 | 11/1997 | Barthel et al. | 423/335 |

*Primary Examiner*—Ronald Martin
*Attorney, Agent, or Firm*—Oblon, Spivak, McClelland, Maier & Neustadt, P.C.

[57] ABSTRACT

An electrostatic developer comprising a mixture of (1) a toner component containing image-forming particles, and (2) particles obtained by subjecting inorganic oxide or organic particles to a hydrophobic treatment with a dimethyl cyclopolysiloxane.

21 Claims, No Drawings ined methods are described in Kirk-Othmer, *Encyclopedia of Chemical Technology*, 4th ed., 9:261–275 (1994).

ELECTROSTATIC TONER COMPOSITION TO ENHANCE COPY QUALITY BY REJECTION OF GHOSTING AND METHOD OF MANUFACTURING SAME

BACKGROUND OF THE INVENTION

1 Field of the Invention

The present invention relates to an electrostatic toner useful for either laser printer and/or plain paper copier machines.

2 Description of the Background

Developing methods and associated toners for use in electrostatic development in electrophotography are known, and include for example, dual-component developing methods, which use as image-forming particles and larger carrier particles, and mono-component developing methods, which use a toner comprising only magnetic or non-magnetic image-forming particles, or with a small amount of additive particles. Such developing methods are described in Kirk-Othmer, *Encyclopedia of Chemical Technology*, 4$^{th}$ ed., 9:261–275 (1994).

An image forming apparatus utilizing an electrophotographic method with toner is well known. In the image forming apparatus utilizing the electrophotographic method, images are generally formed onto a sheet of copy paper through the following processes.

After uniformly charging a photoconductor that serves as an image-holding body, images are exposed onto the surface of the charged photoconductor. Attenuating electrostatic charges during the exposure of light forms a latent image. Then the electrostatic latent images are visualized by developing with toner to form a toner image. The toner images are transferred onto a sheet of copy paper.

A laser printer, a LED printer and the like have been developed in recent years, wherein the image scanning part and the image output part are separated from each other. In these apparatuses, a reversed development method, i.e., the toner is made to adhere to the portions where the charge at the portions of the image exposure has been attenuated, is adopted (in contrast to the above, where toner is made to adhere to the portions where charge still remains in the normal development method).

Transfer of the image-forming particles to the non-image areas causes an undesirable phenomenon in view of image quality as a so-called "ghosting," in which are formed-"memory images" normally formed during contact with the magnetic sleeve roller which is usually part of the toner cartridge assembly. Ghosting can be described as developed image-forming patterns on a latent image-retaining member which are electrostatically transferred to a transfer material such as paper. These images become visual and the image formed can either be lighter than the background formed by toner deposition or darker than the background formed by toner deposition. In instances where the "ghost" image is lighter than the background, this phenomena is known as "negative ghosting." In instances where the "ghost" image is darker than the background, this phenomenon is known as "positive ghosting."

If the ghost image (negative or positive type) is repeated several times on the transfer material (paper), this can usually be attributed to the photoconductor drum allowing a "memory defect" to occur. If, however, the ghost image appears only once on the transfer material (paper), this condition can be usually associated with the magnetic sleeve roller which cannot hold charge and therefore cannot establish the "memory" pattern. It is often possible to measure the distance between the ghost image to determine which component makes the largest contribution to this undesirable imaging issue. However, the actual electrostatic printer or copy machine characteristics, the toner "flowability," toner triboelectric charge properties as well as exponential memory decay times are all related to the "ghosting" phenomena.

Organo silanes and siloxanes have been disclosed in the prior art for various purposes in the field of electrophotography.

U.S. Pat. No. 5,604,039 discloses improved release agents which can be used at elevated temperatures without producing insoluble or undesirable products by gellation. The invention therein provides for a blend of non-phenol-functionalized poly(organosiloxane) fluid and phenol-functionalized poly(organosiloxane) fluid. The fluid is used as a release agent applied to the surface of the fuser member for fusing toner images to the receiving (paper). Octamethyl cyclotetrasiloxane (OCTS) is disclosed as a starting material therein.

U.S. Pat. No. 5,463,453 discloses a wet-type development unit which:
A) uses a carrier liquid composed of petroleum based and silicon based oils and B) toner particles composed of a coloring agent and binder resin dispersed in the carrier liquid. Cyclic dimethyl polysiloxanes inclusive of OCTS are disclosed as useful therein.

U.S. Pat. No. 5,233,008 discloses toner fusing members with an outer layer comprising a melamine-cured polyurethane coating, with increased solvent and thermal resistance. The polyurethane may be obtained from a combination of various starting materials, which may include OCTS.

U.S. Pat. No. 5,464,722 and U.S. Pat. No. 5,447,815 disclose the manufacture of toners and the use of silicone oils and varnishes lor treating toner additives, such as hydrophobic silica fine powder.

However, none of the above-described prior art discloses or suggests the use of dimethyl cyclopolysiloxanes, such as OCTS, against ghosting.

The present invention describes toner composition(s), which are specifically formulated to avoid ghost images, which are likely associated with the magnetic sleeve roller assembly. Although the root cause of the phenomenon is not fully understood, as these ghost images appear, this is an undesirable phenomenon.

SUMMARY OF THE INVENTION

It has been discovered that by using a toner composed of organic, resin-like, particles, or inorganic, such as silica, particles, and having a specific average particle size, and subjected to a specific surface treatment, a development at high resolution power with no transfer of image-forming particles to a non-image area and allowing for high image density and clear images without unnecessary ghost images formed during electrophotography and improved electrostatic recording or the like, is attained. The present invention has been accomplished based on these findings, even in the presence of low humidity conditions.

The specific surface treatment involves treating with a dimethyl cyclopolysiloxane alone, such as octamethyl cyclotetrasiloxane (OCTS), or in combination with other organosilicon compounds. Similarly, the invention includes said surface treated particles with a dimethyl cyclopolysiloxane alone, in combination with particles surface treated with other organosilicon compounds.

The present invention is an electrostatic developer comprising a mixture of (1) a toner component containing image-forming particles, and (2) particles obtained by subjecting inorganic oxide or organic particles to a hydrophobic treatment with a dimethyl cyclopolysiloxane.

DETAILED DESCRIPTION OF THE INVENTION

The present invention is an electrostatic developer comprising a toner component and organic or inorganic oxide particles which are subjected to a hydrophobic treatment with a dimethyl cyclopolysiloxane, preferably OCTS. Said hydrophobic treatment has been shown as an effective measure to reduce or eliminate the undesirable phenomenon known as "ghosting."

Dimethyl cyclopolysiloxanes have the following formula

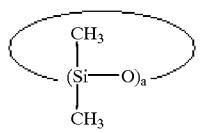

wherein a is a number from 3 and 6. Preferably, a is 4, i.e., the compound is OCTS, which has the following structural formula:

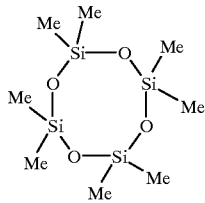

The toner component may be any of the toners known in the art, such as magnetic and non-magnetic mono-component, and dual-component developers. In these toners, the average particle size of the toner is most preferably about 6–12 μm. In the dual-component developer, the carrier particles generally have a particle size which is much larger than that of the toner particle size and are generally present in an amount greater than 90% by weight of the total composition.

Key steps in transfer electrophotography include the charging step, the development step, and the transfer step. In the charging step, ions are deposited on the surface of the photoconductor drum. In the exposure step, light strikes the charged photoreceptor surface and mobile carriers formed within the photoreceptor layer neutralize the surface charges. Thus, the charge on the surface is transmitted in the exposed areas of the photoconductive layer to the oppositely charged metal substrate of the drum. In the development step, a thermoplastic pigmented powder (toner) which carries a charge is brought close to the photoreceptor so that toner particles are directed to the charge image regions on the photoreceptor. In the transfer step, a sheet of paper (non-imaging area) is brought into physical contact with the toned photoreceptor and the toner is transferred to the paper, thereby transferring the image, by applying a charge to the backside of the paper.

The developer used in the present invention contains image-forming particles and other particles subjected to a hydrophobic treatment with preferably OCTS, and may also contain organic or inorganic particles having a particle size of not more than that of the image-forming particles, for further improving the image.

As the image-forming particles in the present invention, a magnetic toner comprising a magnetic powder and a binder resin is usually used. In addition, it is possible to employ the use of toner without magnetic powder. The toner is a powder having an average particle size usually from 4 to 20 μm, preferably from 5 to 15 μm, more preferably 5 to 12 μm, and most preferably from 6 to 12 μm, obtained by kneading and dispersing, if required, together with optionally, a colorant, a charge control agent or the like by a kneader and/or extruder, pulverizing after cooling and then classifying them by size. Average particle size of a particular range means that greater than 50% by volume of the particles have a particle size within the range, also known as $d_{50}$.

Various known toner constituent ingredients can be used. In addition, the possibility exists to utilize "polymerized" toner whereby all components with monomer(s) are usually blended prior to a one time, final polymerization.

For "non-polymerized" or conventional toner, the binder resin for the toner can be selected from a wide variety of materials including known thermoplastic resins. There can be mentioned, for example, styrene resin (homo- or copolymer containing styrene or substituted styrene) such as a polystyrene, polychlorostyrene, poly-α-methylstyrene, styrene-chlorostyrene polymer, styrene-propylene copolymer, styrene-butadiene copolymer, styrene-vinyl chloride copolymer, styrene-vinyl acetate copolymer, styrene-maleic acid copolymer, styrene-acrylate copolymer (for example, styrene-methyl acrylate copolymer, styrene-ethyl acrylate copolymer, styrene-butyl acrylate copolymer, styrene-octyl acrylate copolymer and styrene-phenyl acrylate copolymer), styrene-methacrylate copolymer (for example, styrene-methyl methacrylate copolymer, styrene-ethyl methacrylate copolymer, styrene-butyl methacrylate copolymer and stryene-phenyl methacrylate copolymer), styrene-methyl á-chloroacrylate copolymer and styrene-acrylonitrile-acrylate copolymer, vinyl chloride resin, resin modified maleic acid resin, phenolic resin, epoxy resin, saturated or unsaturated polyester resin, low molecular weight polyethylene, low molecular weight polypropylene, ionomer resin, polyurethane resin, silicone resin, ketone resin, ethylene-ethyl acrylate copolymer, xylene resin and polyvinyl butyral resin. Preferred resins include styrene resin, and saturated or unsaturated polyester resin. Further, the above-mentioned resins may be used not only alone, but also as a combination of two or more of them.

The magnetic powder for the toner of the present invention includes ferromagnetic materials exhibiting ferromagnetism including ferrimagnetism in a working circumstance temperature (around 0° to 60° C.) for office business machines, plain paper copiers, printers, etc. For example, there can be mentioned magnetic powder showing ferromagnetism or ferrimagnetism in a temperature range of about 0° to 60° C., selected from magnetite ($Fe_3O_4$), maghemite ($\gamma$-$Fe_2O_3$), a complex of magnetite and maghemite, spinal ferrite such as ferrite ($M_xFe_{3-x}O_4$ in which M represents Mn, Fe, Co, Ni, Cu, Mg, Zn, Cd or mixed crystal materials thereof), hexagonal ferrites such as $BaO.6Fe_2O_3$, garnet-type oxide such as $Y_3 Fe_5O_{12}$, retile-type oxide such as $CrO_2$, metal such as Fe, Mn, Ni, Co, and Cr, as well as other ferromagnetic alloys. Among them, a powder of magnetite, maghemite or a complex product of magnetite and maghemite with an average particle size of not more the 3 μm, more preferably about 0.05 to 1 μm are preferred in view of the performance and the cost. The above-mentioned magnetic powder may be used not only alone but also as a combination of two or more of them.

As an example of manufacture of mono-component magnetic toner, the blending weight ratio of the binder resin to the magnetic powder can be selected within a range from 1:3 to 7:1, while taking the fixing property to a transfer material into consideration.

As a colorant used for the toner, any of known dyes and pigments such as carbon black, lamp black, ultramarine, nigrosine dye, aniline blue, phthalocyanine blue, phthalocyanine green, hanza yellow G, rhodamine type dye and pigment, chrome yellow, quinacridone, benzidine yellow, rose bengale, triallylmethane dyes, monoazo and disazo dyes and pigments may be used alone or in admixture. The addition amount of the colorant into the toner is preferably from 0.1 to 30 parts by weight, more preferably 0.5 to 10 parts by weight, based on 100 parts by weight of the binder resin. The fixing property becomes poor if the amount is excessive, thus showing undesirable tendency.

Examples of the charge controller are well known by way of reference for example, U.S. Pat. No. 4,957,840 and may include; nigrosine and its modification products modified by a fatty acid metal salt; quaternary ammonium salts, such as tributylbenzyl-ammonium-1 hydroxy-4-naphthosulfonic acid salt, and tetrabutylammonium tetrafluoroborate; diorganotin oxides, such as dibutyltin oxide, dioctyltin oxide, and dicyclohexyltin oxide; and diorganotin borates, such as dibutyltin borate, dioctyltin borate, and dicyclo-hexyltin borate. These positive charge controllers may be used singly or as a mixture of two or more species. Among these, a nigrosine-type charge controller or a quaternary ammonium salt charge controller may particularly preferably be used.

As another type of positive charge controller, there may be used a homopolymer of a monomer having an amino group represented by the formula:

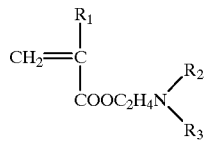

wherein $R_1$ represents H or $CH_3$; and $R_2$ and $R_3$ each represent a substituted or unsubstituted alkyl group (preferably $C_1$–$C_4$); or a copolymer of the monomer having an amine group with another polymerizable monomer such as styrene, acrylates, and methacrylates as described above. In this case, the positive charge controller also has a function of a binder.

On the other hand, a negative charge controller can be used in the present invention. Examples thereof may include an organic metal complex or a chelate compound. More specifically there may preferably be used aluminum acetylacetonate, iron (II) acetylacetonate, and a 3.5-di-tertiary butylsalicylic acid chromium. There may more preferably be used acetylacetone complexes, or salicylic acid-type metal salts or complexes. Among these, salicylic acid-type complexes or metal salts may particularly preferably be used.

It is preferred that the above-mentioned charge controller is used in the form of fine powder. In such case, the number-average particle size thereof may preferably be 4 microns or smaller, more preferably 3 microns or smaller.

In the case of internal addition, such charge controller may preferably be used in an amount of 0.1–20 wt. parts, more preferably 0.2–10 wt. parts, per 100 wt. parts of a binder resin.

Charging for the toner may be controlled by the binder resin or the dye and pigment per se and, if required, a charge control agent causing no problem in view of the color reproduction may also be used together. As the charge control agents, basic electron donating substances such as a nigrosine dye quaternary ammonium salt, and may be used for a positive charge control agent, while acidic and electron attracting substances such as metal chelates or metallized dyes may be used as a negative charge controller while properly selecting them. It is also possible to include charge control resins.

The additional amount of the charge control agent may be determined, by taking into consideration, the conditions for the manufacturing method including the chargeability of the binder resin, the addition amount of the colorant and the dispersion method, as well as the chargeability of the other additives. The amount thereof is preferably from 0.1 to 10 parts by weight based on the 100 parts by weight of the binder resin.

The charge control agent or resin may be used in admixture with the binder resin.

The toner used in the present invention may preferably contain a low-molecular weight wax in an amount of from 0.1 parts to 20 parts by weight, and more preferably from 0.5 to 10 parts by weight, based on 100 parts by weight of the binder resin component. The low-molecular weight wax contained in the magnetic toner of the present invention may include the following: alicyclic hydrocarbon resin, aromatic petroleum resin, chlorinated paraffin and paraffin wax, aliphatic hydrocarbon waxes such as low-molecular weight polypropylene, hydrocarbon waxes, such as oxidized polyethylene wax; block copolymers of these; waxes mainly composed of aliphatic esters, such as carnauba wax, saozole wax and monotate wax; and waxes obtained by deodorizing partly or wholly fatty acid esters, such as deodorized carnauba wax. It may also include straight chain saturated fatty acids such as palmitic acid, stearic acid and montanic acid; unsaturated fatty acids such as brassidic acid, eleostearic acid and parinnaric acid; saturated alcohols such as stearyl alcohol aralkyl alcohol, behenyl alcohol, carnaubyl alcohol, ceryl alcohol and melissyl alcohol; polyhydric alcohols such as sorbitol; fatty acid amides such as linolic acid amide, oleic acid amide, and lauric acid amide; saturated fatty acid bisamides such as methylenebisstearic acid amide, ethylenebiscarpric acid amide, ethylenebislauric acid amide, and hexamethylenebisstearic acid amide; unsaturated fatty amides such as ethylenebisoleic acid amide, hexamethylenebisoleic acid amide, N,N'-bisdi-oleyladipic acid amide and N,N'-bisdioleylcebasic acid amide; aromatic bisamides such as xylenebisstearic acid amide and N,N'-distearylisophthalic acid amide; fatty acid metal: salts (what are commonly called metal soaps) such as calcium stearate, calcium laurate, zinc stearate, and magnesium stearate; waxes obtained by grafting vinyl monomers such as styrene and acrylic acid onto aliphatic hydrocarbon waxes; partially esterified products of fatty acids such as behenic acid monoglyceride with polyhydrie alcohols; and methyl ester compounds having a hydroxyl group, obtained by hydrogenation of vegetable fats and oils.

In addition, auxiliary agents such as various kinds of plasticizers and releasing agents may also be added to the toner for adjusting thermal properties, physical properties, etc. The addition amount thereof is preferably from 0.1 to 10 parts by weight based on 100 parts by weight of the toner.

The organic particles that are hydrophobically treated according to the present invention is preferably a resinous material. Examples of such resinous materials are exemplified by, but not limited to, thermoplastic resins such as polystyrenes, poly(metha)acrylic resins, polyolefin resins, polyamide resins, polycarbonate resins, polyether resins, poly(sulfine acid) resins, polyester resins, epoxy resins, polybutyral resins, urea resins, urethane/urea resins, silicon resins, polyethylene resins, teflon resins and the like (fluoropolymer resins), thermosetting resins, a mixture thereof, block copolymers thereof, graft copolymers thereof, a blend thereof, and the like.

The inorganic oxide particles that are hydrophobically treated according to the present invention are preferably selected from the group consisting of $SiO_2$, $Al_2O_3$, $W_2O_3$, $ZrO_2$, SeO, $TiO_2$, ZnO and MgO. $SiO_2$ is most preferred.

The hydrophobically treated particles preferably have a BET measurement value of not less than 1 $m^2/g$, more preferably not less than 30 $m^2/g$ and even more preferably not less than 1 $m^2/g$.

In the hydrophobic treatment with a dimethyl cyclopolysiloxane such as OCTS of the surface of the particles, organosilicon, such as silane/siloxane, treatments may be carried out, such as with polydimethylsiloxane or polymethylphenylsiloxane or alkyl modified silicone or fluorinated silicone. Examples of such treatment are as described in U.S. Pat. No. 5,686,054, which is hereby incorporated by reference, where the organosilicon compounds employed are preferably organosilanes of the formula:

$$R^1{}_n SiX_{4-n}$$

in which $R^1$ is identical or different and is monovalent, optionally halogenated, hydrocarbon radical having 1 to 18 carbon atoms, X is identical or different and is a halogen, preferably chlorine, or OH, $OR^2$, $OCOR^2$, $O(CH_2)_xOR^2$, $R^2$ is identical or different and is monovalent hydrocarbon radical having 1 to 8 carbon atoms, n is 1 or 2, preferably 2, and x is 1, 2 or 3 preferably 1, and/or organosiloxanes of the formula $$(R^1{}_aX_bSiO_{1/2})_z(R^1{}_2SiO_{2/2})_x(R^3R^1SiO_{2/2})_y(SiX_bR^1{}_a)_z$$

in which
R¹ is as defined above
R² is as defined above,
R³ is identical or different, is a hydrogen or a monovalent, optionally halogenated, hydrocarbon radical having 1 to 18 carbon atoms which is different from R¹,
X is as defined above, preferably OH,
a is 0, 1, 2 or 3, preferably 2,
b is 0, 1, 2, or 3, preferably 1, the sum of A+B being equal to 3,
x is 0 or an integer from 1 to 200, preferably from 10 to 50,
y is 0 or an integer from 1 to 200, with x to y preferably being at least equal to 5 to 1, and the sum x+y being equal to 0 or an integer between 1 and 200, preferably from 10 to 50,
z is 0 or 1 with the proviso that z is greater than 0 if the sum of x+y is 0, and z is preferably 1.

As a simple method of surface treatment, OCTS, for example, is usually mixed at a ratio properly selected from a range of 0.01 to 100 parts by weight, based on 100 parts by weight of a fine organic or inorganic oxide powder depending on the specific surface area of the particles or the hydrophobic degree, for example, by a Henschel mixer, spraying, or physio-chemical reaction of liquid or gas or by any preferred method such as described in U.S. Pat. No. 5,686,054. OCTS may be used directly or dissolved in a solvent such as toluene, xylene or trichloroethylene, then the resultant solution may be mixed with particles.

In the hydrophobic treatment of the present invention, the OCTS or other dimethyl cyclopolysiloxane may be used as the only silicone treatment, or may be used in combination with one or more other organosilicon compounds to coat particles with a mixture of the cyclopolysiloxane and other silicon compounds. In addition, the particles treated with a cyclopolysiloxane as the only hydrophobic treatment of the present invention can be mixed with particles treated with one or more other organosilicon compounds.

Therefore, in addition to or in lieu of OCTS treatment, other particles may be subjected to other hydrophobic treatment(s) using organosilicon compounds such as dimethyldichlorosilane (DMDS), trimethylchlorosilane (TMS), hexamethyldisilizane (HMDS), and the like, as disclosed in, for example, Japanese Patent Application Laid—Open (KOKAI) 63-139367 (1988) (for example, hydrophobic silica Aerosil R972, manufactured by Degussa Co.).

The organic or inorganic oxide particles subjected to any of the aforementioned hydrophobic treatments, may be used in any amount, and preferably in a ghost-reducing effective amount. This amount is more preferably within a range of about 0.01 to 5 parts, and even more preferably 0.05 to 3 parts, by weight based on 100 parts by weight of the image-forming particles.

For example, inorganic oxides treated with OCTS of the present invention are the Aerosil line of OCTS-treated fumed silicas available from Degussa, particularly Aerosil R104 and R106. Aerosil R104 and Aerosil R106 are obtained by aftertreating Aerosil 200 and Aerosil 300, respectively, with OCTS to hydrophobize same. Aerosil 200 and Aerosil 300 are each hydrophilic fumed silicas having a BET of 200±25 $m^2/g$ and average primary particle size of 12 nm, and a BET of 300±30 $m^2/g$ and average primary particle size of 7 nm, respectively. The BET of Aerosil R104 and Aerosil R106 is 150±25 $m^2/g$, and 250±30 $m^2/g$, respectively.

In electrophotography, electrostatic recording, or the like in which the developing method and the toner according to the present invention are used, the image-forming particles do not transfer to the non-image area and clear images can be formed, as well as unnecessary consumption of the image-lorming particles can be suppressed, thereby providing great industrial merit. Additionally, the invention provides for elimination of the phenomenon described as ghosting.

Having generally described this invention, a further understanding can be obtained by reference to certain specific examples which are provided herein for purposes of illustration only and are not intended to be limiting unless otherwise specified. These examples describe, but are not limited to, the preparation of toner by conventional process means as described below.

EXAMPLES

All Examples and Comparative Examples were subjected to an image formulation test by using a commercially available Laser Beam printer device using a "jumping-development system" technique. Evaluation was carried out under two sets of conditions—normal temperature-normal humidity (N,N=70° F., 50%RH) and normal temperature-low humidity (N, L=70° F., 15%RH). The latter condition is the more severe of the two conditions. Low humidity was obtained by using an environmental chamber where both temperature and humidity were fully controlled as previously described. The results shown in Tables 1 and 2 below are based on testing and measurements as described below.

The most conventional process for toner manufacture includes the steps of (1) premixing, (2) kneading, (3) pulverizing or classifying, (4) postadding and (5) sifting. This invention relates specifically to step (4), i.e., postadding with special additives to ensure proper toner and print quality. The following examples are specific to this step in the toner manufacturing process. In each of the Examples and Comparative Examples, the image forming particles were the same; only the additive was different. After sifting step (5), each of the Examples and Comparative Examples were tested for ghosting, image density (ID), background, void, offset, etc. under each of the above temperature and humidity conditions. The toners of the examples had a particle size of 6–12 μm.

Example 1

Styrene-butyl acrylate copolymer (bi-modal ,H/L=2/8, Mw=22.1×10$^4$,) 100 parts by weight; magnetite (ós=0.85 emu/g , Hc=99 Oe, average particle size=200 nm), 85 parts by weight;
polypropylene wax (Mn:7000) 4 parts by weight; and a chromium based organic metal complex, 1 part by weight; the descriptions of which were given above, were all well blended in a blender and melt-kneaded by means of a twin screw extruder.

The kneaded product was cooled, coarsely crushed by hammer mill, finally pulverized and classified by means of a pulverizer using jet air stream, and classified, thereby to obtain classified powder having a volume-median particle size of 8.0 microns. The volume-basis distribution of the fine powder was measured by means of a Coulter counter Model Multisizer with a 100 micron-aperture. Then, 100 wt. parts of above fine powder were mixed with 0.5 wt. parts of R104 treated with OCTS with a BET value of 200 m$^2$/g, by means of a Henschel Mixer. The resultant mixture was passed through a 100-mesh screen, whereby powder 10 passing through the screen was evaluated and labeled as Example 1.

Measurements of the image density was measured by a RD918 densitometer available from Macbeth Corp. The I.D. value, greater than 1.30, and preferably greater than 1.40 densitometer light meter determines optical density by measuring the intensity of transmitted or reflected light. In this case, the light is reflected from a predetermined image pattern and compared with that of the light reflected from both predetermined "white" and solid dark black square image sections from a "control" used for initial calibration. Image density can be described as the actual density of the toner deposited onto a non-imaged area from the reproduction by electrophotographic means of an object, usually text or reproduced photo images, the quality of which is judged by the boldness or darkness, and lack of blurs or other defects.

Example 2

The same image forming particle composition as described in Example 1 wherein 100 wt. parts of above fine powder were mixed with 1.0 wt. parts of R104 OCTS treated silica with a BET value of 200 m$^2$/g, by means of a Henschel Mixer. The resultant mixture was passed through a 100-mesh screen, whereby powder passing through the screen was evaluated and labeled as Example 2.

Example 3

The same image forming particle composition as described in Example 1 wherein 100 wt. parts of above fine powder were mixed with 0.5 wt. parts of R106 OCTS treated silica with a BET value of 300 m$^2$/g, by means of a Henschel Mixer. The resultant mixture was passed through a 100-mesh screen, whereby powder passing through the screen was evaluated and labeled as Example 3.

Comparative Example 1

The same image forming particle composition as described in Example 1 wherein 100 wt. parts of above fine powder were mixed with 0.5 wt. parts of RY 200 silicone oil (a non-cyclic silicone) treated silica with a BET value of 200 m$^2$/g, by means of a Henschel Mixer. The resultant mixture was passed through a 100-mesh screen, whereby powder passing through the screen was evaluated and labeled as Comparative Example 1.

Comparative Example 2

The same image forming particle composition as described in Example 1 wherein 100 wt. parts of above fine powder were mixed with 0.5 wt. parts of US 204 silicone oil (a non-cyclic silicone) treated silica with a BET value of 130 m$^2$/g, by means of a Henschel Mixer. The resultant mixture was passed through a 100-mesh screen, whereby powder passing through the screen was evaluated and labeled as Comparative Example 2.

Comparative Example 3

The same image forming particle composition as described in Example 1 wherein 100 wt. parts of the above fine powder were mixed with 0.5 wt. parts of R812 (Degussa) hexamethyldisilizane (HMDS) treated silica with a BET value of 300 m$^2$/g. The resultant mixture was passed through a 100-mesh screen, whereby powder passing through the screen was evaluated and labeled as Comparative Example 3.

Comparative Example 4

The same image forming particle composition as described in Example 1 wherein 100 wt. parts of the above fine powder were mixed with 0.5 wt. parts of HDKH 1018 (Clariant) double treated with silicone oil and HMDS silica with a BET value of 300 m$^2$/g. The resultant mixture was passed through a 100-mesh screen, whereby powder passing through the screen was evaluated and labeled as Comparative Example 4.

Table 1 below describes the results:

TABLE 1

| Toner Sample No. | Additive (pph) | Density Values N/N | Density Values N/L | Ghosting Values N/N | Ghosting Values N/L | Comments |
|---|---|---|---|---|---|---|
| Example 1 | (0.5)-OCTS (R104) treated silica BET = 200 | 1.45 | 1.39 | 0 | 0 | No ghosting under normal conditions- very slight under low humidity |
| Example 2 | (1.0)-OCTS (R104) treated silica BET = 200 | 1.45 | 1.46 | 0 | Δ | No ghosting under normal conditions- slight under low humidity |
| Example 3 | (0.5)-OCTS (R106) treated silica BET = 300 | 1.40 | 1.33 | 0 | 0 | No ghosting under normal conditions- very slight under low humidity |
| Comparative Example 1 | (0.5)-RY 200 Degussa silicone oil treated silica- BET = 200 | 1.46 | 1.43 | Δ | X | Ghosting occurs and is worse under low humidity |
| Comparative Example 2 | (0.5)-US 204 Degussa silicone oil treated silica- BET = 130 | 1.42 | | X | | Not tested at low humidity |
| Comparative Example 3 | (0.5)-R812 Degussa HMDS treated silica BET = 300 | 1.40 | | Δ | | Not tested at low humidity |
| Comparative Example 4 | (0.5)-HDKH 1018 Clariant silicone oil and HMDS treated silica BET = 300 | 1.46 | | X | | Not tested at low humidity |

N/N = normal temperature and humidity condition (room conditions)
N/L = normal temperature and low humidity condition (more severe)

In Table 1:
o=best case
Δ=intermediate case
X=worst case

In Table 1, ghosting was identified visually by those skilled at reviewing image copy quality. On a scale of 0 to −5, 0 being the absolutely best case, and −5 being the absolutely worst case, the above reviews were carried out. In general, a score of "o" includes 0 to −1; Δ includes −2 to −3, and X includes −4 to −5.

Mixer size and rotation speed was normally 5–20 liters and 1000–3000 rpm respectively Low humidity was obtained by using an environmental chamber where both temperature and humidity can be fully controlled. Temperature control to +/−5° F. and humidity to +/−3% RH.

Table 2 below indicates the general trend seen for the experiments performed with respect to reduction of ghosting and the respective effect on the image density.

TABLE 2

General Comparison of the Effect of Various Silica Treatments on Image Ghosting and Density

| Silica Additive Treatment | Ghosting and Temperature/Humidity Condition N/L | Ghosting and Temperature/Humidity Condition N/N | Image Density |
|---|---|---|---|
| Linear silicone polymer | X | Δ | O |
| OCTS | O | O | O |
| HMDS Hexamethyldisilizane | — | X | O |
| DDS Dimethyldisilizane | — | X | O |

N/N = normal temperature and humidity condition (room conditions)
N/L = normal temperature and low humidity condition (more severe for ghosting)
O = best case
Δ = intermediate case
X = worst case Every description in the above specification of a numerical range and of a genus is intended to inherently include a description of all possible values and subranges within the range, and all possible species and subgenuses within the genus, respectively.

Obviously, numerous modifications and variations of the present invention are possible in light of the above teachings. It is therefore to be understood that within the scope of the appended claims, the invention may be practiced otherwise than as specifically described herein.

We claim:

1. An electrostatic developer comprising a mixture of (1) a toner component containing image-forming particles, and (2) particles obtained by subjecting inorganic oxide or organic particles to a hydrophobic treatment with a dimethyl cyclopolysiloxane.

2. The electrostatic developer of claim 1, wherein component (2) is present in ghost-reducing effective amounts.

3. The electrostatic developer of claim 2, wherein the toner component is a mono-component toner or a dual-component toner.

4. The electrostatic developer of claim 2, wherein the dimethyl cyclopolysiloxane has the following formula:

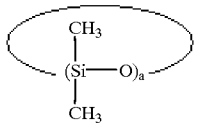

wherein a is a number from 3 to 6.

5. The electrostatic developer of claim 2, wherein the dimethyl cyclopolysiloxane is octamethyl cyclotetrasiloxane.

6. The electrostatic developer of claim 2, wherein the particles of component (2) comprise an inorganic oxide selected from the group consisting of $SiO_2$, $Al_2O_3$, $W_2O_3$, $ZrO_2$, $SeO$, $TiO_2$, $ZnO$ and $MgO$.

7. The electrostatic developer of claim 6, wherein the inorganic oxide is $SiO_2$.

8. The electrostatic developer of claim 5, wherein the particles of component (2) comprise $SiO_2$.

9. The electrostatic developer of claim 2, wherein the toner component is a mono-component toner.

10. The electrostatic developer of claim 2, wherein the image forming particles comprise a magnetic powder and a binder resin.

11. The electrostatic developer of claim 10, wherein the weight ratio of the binder resin to the magnetic powder is within a range of from 1:3 to 7:1.

12. The electrostatic developer of claim 10, wherein the binder resin is selected from the group consisting of styrene resins, saturated polyester resins, and unsaturated polyester resins.

13. The electrostatic developer of claim 2, wherein the image forming particles exhibit a negative charge during electrostatic development.

14. The electrostatic developer of claim 2, wherein the toner has an average particle size of from 5 to 12 $\mu$m.

15. The electrostatic developer of claim 2, wherein component (2) is present in an amount of about 0.01 to 5 parts by weight per 100 parts of component (1).

16. The electrostatic developer of claim 2, wherein component (2) is present in an amount of about 0.05 to 3 parts by weight per 100 parts of component (1).

17. The electrostatic developer of claim 2, wherein component (2) has a BET specific surface area of not less than 1 $m^2/g$.

18. The electrostatic developer of claim 2, wherein component (2) has a BET specific surface area of not less than 30 $m^2/g$.

19. The electrostatic developer of claim 2, wherein component (2) has a BET specific surface area of not less than 100 $m^2/g$.

20. The electrostatic developer of claim 2, wherein the hydrophobic treatment is carried out with a dimethyl cyclopolysiloxane in combination with no other organosilicon compound.

21. The electrostatic developer of claim 2, wherein the hydrophobic treatment is carried out with a dimethyl cyclopolysiloxane in combination with one or more noncyclic organosilicon compounds.

* * * * *

UNITED STATES PATENT AND TRADEMARK OFFICE
CERTIFICATE OF CORRECTION

PATENT NO. : 5,981,131

DATED : November 9, 1999

INVENTOR(S): Kazuhiro HIRAMA et al.

It is certified that an error appears in the above-identified patent and that said Letters Patent is hereby corrected as shown below:

On the title page, item [54] and at the     of Column 1, the title should be:

--ELECTROSTATIC TONER COMPOSITION TO ENHANCE COPY QUALITY BY REDUCTION OF GHOSTING AND METHOD OF MANUFACTURING SAME--

Signed and Sealed this

Twenty-seventh Day of February, 2001

' Attest:

NICHOLAS P. GODICI

Attesting Officer      Acting Director of the United States Patent and Trademark Office